(12) United States Patent
Mosher et al.

(10) Patent No.: US 10,926,976 B2
(45) Date of Patent: Feb. 23, 2021

(54) BELT WITH CORRUGATED MATERIAL

(71) Applicant: Otis Elevator Company, Farmington, CT (US)

(72) Inventors: Daniel A. Mosher, Glastonbury, CT (US); Brad Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 281 days.

(21) Appl. No.: 16/011,171

(22) Filed: Jun. 18, 2018

(65) Prior Publication Data
US 2019/0382242 A1 Dec. 19, 2019

(51) Int. Cl.
*B66B 7/06* (2006.01)
*D07B 5/00* (2006.01)
*F16G 1/28* (2006.01)

(52) U.S. Cl.
CPC .............. *B66B 7/062* (2013.01); *D07B 5/005* (2013.01); *F16G 1/28* (2013.01); *D07B 2201/1004* (2013.01); *D07B 2201/2085* (2013.01); *D07B 2201/2088* (2013.01); *D07B 2501/2007* (2013.01)

(58) Field of Classification Search
CPC B66B 7/062; D07B 5/005; D07B 2201/1004; D07B 2201/2085; D07B 2201/2088; D07B 2501/2007; F16G 1/28
See application file for complete search history.

(56) References Cited

U.S. PATENT DOCUMENTS

| | | | | |
|---|---|---|---|---|
| 1,475,250 | A | * 11/1923 | Sundh | D07B 1/22 254/266 |
| 2,292,124 | A | * 8/1942 | Hynes | D07B 1/22 174/70 R |
| 4,559,029 | A | * 12/1985 | Miranti, Jr. | F16G 5/00 474/205 |
| 5,178,586 | A | * 1/1993 | Mizuno | D03D 15/00 474/266 |

(Continued)

FOREIGN PATENT DOCUMENTS

| | | |
|---|---|---|
| CN | 103267086 A | 8/2013 |
| EP | 0185008 B1 | 6/1988 |

(Continued)

OTHER PUBLICATIONS

Chinese Office Action for Chinese Application No. 201910521274.8, dated Jul. 2, 2020, 9 pages.

(Continued)

*Primary Examiner* — Michael A Riegelman
(74) *Attorney, Agent, or Firm* — Cantor Colburn LLP

(57) ABSTRACT

An elevator system includes a hoistway, an elevator car movable along the hoistway, and one or more belts operably connected to the elevator car to propel the elevator car along the hoistway. A belt of the one or more belts includes one or more tension elements extending along a belt length, and a jacket at least partially encapsulating the one or more tension elements. The jacket includes a jacket base formed from a first material and one or more insert layers embedded in the jacket base material. The one or more insert layers have a corrugated shape along the belt length, and are formed from a second material different from the first material.

16 Claims, 8 Drawing Sheets

(56) References Cited

U.S. PATENT DOCUMENTS

| | | | | |
|---|---|---|---|---|
| 5,531,649 | A * | 7/1996 | Osako | F16G 1/28 |
| | | | | 474/205 |
| 6,056,656 | A * | 5/2000 | Kitano | F16G 5/20 |
| | | | | 474/205 |
| 6,103,349 | A * | 8/2000 | Matsumoto | F16G 1/00 |
| | | | | 198/502.1 |
| 7,670,240 | B2 * | 3/2010 | Pitts | D07B 5/006 |
| | | | | 474/237 |
| 7,748,501 | B2 * | 7/2010 | Marler | B66B 7/062 |
| | | | | 187/251 |
| 7,780,561 | B2 * | 8/2010 | Nosaka | B44C 1/228 |
| | | | | 474/260 |
| 8,191,705 | B2 * | 6/2012 | Hopfe | B65G 15/38 |
| | | | | 198/847 |
| 8,673,433 | B2 * | 3/2014 | Reif | B66B 7/062 |
| | | | | 428/212 |
| 8,709,214 | B2 * | 4/2014 | Inoue | D21F 7/086 |
| | | | | 162/358.2 |
| 9,546,447 | B2 * | 1/2017 | Wesson | B66B 7/062 |
| 10,800,637 | B2 * | 10/2020 | Zhao | D07B 5/04 |
| 2004/0014544 | A1 * | 1/2004 | Ito | B29D 29/085 |
| | | | | 474/251 |
| 2013/0042939 | A1 * | 2/2013 | Wesson | D03D 13/004 |
| | | | | 139/11 |
| 2013/0167967 | A1 * | 7/2013 | Wesson | D03D 1/0094 |
| | | | | 139/11 |
| 2015/0191331 | A1 * | 7/2015 | Orelup | D07B 5/00 |
| | | | | 428/76 |
| 2017/0022029 | A1 * | 1/2017 | Guilani | B66B 9/00 |
| 2017/0036891 | A1 * | 2/2017 | Lehtinen | B66B 7/085 |
| 2017/0057787 | A1 * | 3/2017 | Zhao | B29C 65/48 |
| 2017/0101293 | A1 * | 4/2017 | Eastman | D07B 5/006 |
| 2017/0225925 | A1 * | 8/2017 | Wesson | B66B 11/0045 |
| 2019/0071281 | A1 * | 3/2019 | Zhao | B66B 7/062 |
| 2019/0299553 | A1 * | 10/2019 | Dudde | B66B 7/062 |
| 2019/0301088 | A1 * | 10/2019 | Dudde | B66B 7/062 |
| 2019/0382242 | A1 * | 12/2019 | Mosher | D07B 7/145 |

FOREIGN PATENT DOCUMENTS

| | | |
|---|---|---|
| EP | 0185006 B1 | 1/1989 |
| EP | 0489694 A1 | 6/1992 |
| EP | 1461281 B1 | 10/2007 |
| EP | 1396458 B1 | 4/2010 |
| EP | 2105460 B1 | 10/2016 |
| EP | 3243785 A1 | 11/2017 |
| WO | 0114630 A1 | 3/2001 |
| WO | 2017160581 A1 | 9/2017 |

OTHER PUBLICATIONS

European Search Report for European Application No. 19181045.6, dated Mar. 31, 2020, 6 pages.

Monster Belting, Rubber Conveyor Belt, "Specializing in the production of conveyor belts.", Accessed Online: Jun. 18, 2018, 5 Pages, Monster Belting Industry Co.,Ltd, City of Qingdao, Shandong Province, China. URL:http://www.monsterbelt.com/steel-cord-belting/steel-cord-conveyor-belt/stainless-steel-conveyor-system-with-flat.html.

* cited by examiner

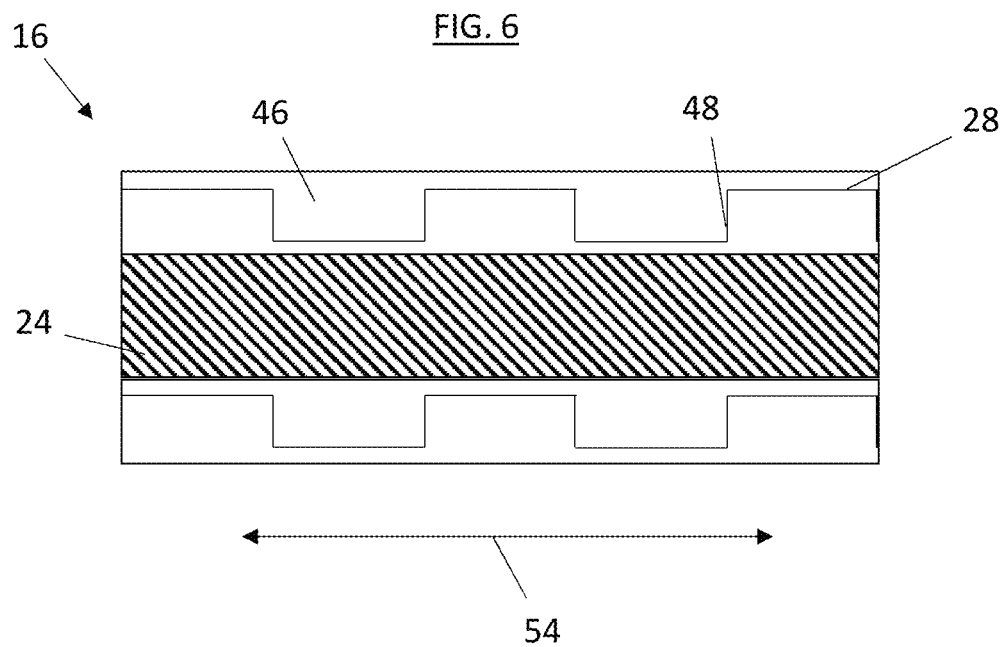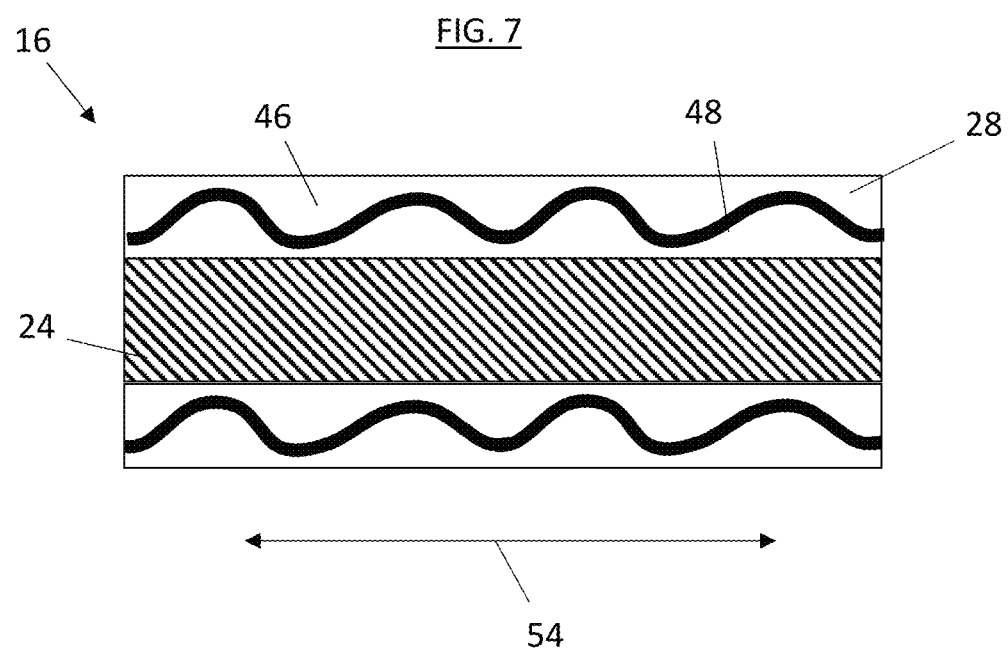

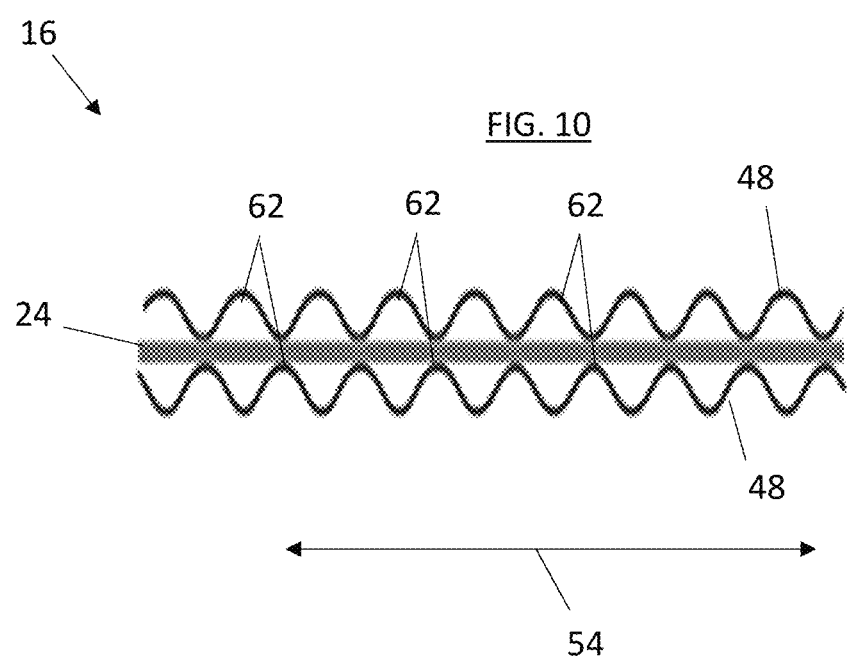

BELT WITH CORRUGATED MATERIAL

BACKGROUND

Exemplary embodiments pertain to the art of elevator systems. More particularly, the present disclosure relates to belts for suspending and/or driving elevator cars of elevator systems.

Elevator systems utilize a tension member operably connected to an elevator car and a counterweight in combination with, for example, a machine and traction sheave, to suspend and drive the elevator car along a hoistway. In some systems, the tension member is a belt having one or more tension elements retained in a jacket. The tension elements may be formed from, for example, steel wires or other materials, such as carbon fiber composites or synthetic fibers. The tension elements support the load and the jacket holds the tension elements and transfers shear forces to the traction sheave.

The belt must be configured to bend around the traction sheave and other components of the system. In a typical steel cord belt, the cords achieve their ability to bend by their twisted structure that allows sliding of the steel wires and strands. The jacket material, however, is monolithic and is not constructed for sliding, so the materials utilized are elastomeric, capable of large strains, in order for the belt to be able to bend around relatively small sheaves and have a long service life. This imposes restrictions of the types of materials that can be used in the construction of the jacket.

BRIEF DESCRIPTION

In one embodiment, a belt for an elevator system includes one or more tension elements extending along a belt length and a jacket at least partially encapsulating the one or more tension elements. The jacket includes a jacket base, and one or more insert layers embedded in the jacket base. The one or more insert layers having a corrugated shape along the belt length.

Additionally or alternatively, in this or other embodiments the corrugated shape is one or more of sinusoidal, triangular or rectangular.

Additionally or alternatively, in this or other embodiments the jacket base is formed from a first material and the insert layer is formed from a second material different from the first material.

Additionally or alternatively, in this or other embodiments the second material is non-elastomeric and has a melting temperature that is at least 10° C. higher than the processing temperature required to form the jacket base material.

Additionally or alternatively, in this or other embodiments the one or more insert layers contact the one or more tension elements.

Additionally or alternatively, in this or other embodiments the one or more insert layers at least partially define an outer surface of the belt.

Additionally or alternatively, in this or other embodiments the corrugated shape has a peak to valley height of at least three times a thickness of the insert layer.

Additionally or alternatively, in this or other embodiments the corrugated shape has a peak to valley height of at least four times a thickness of the insert layer.

Additionally or alternatively, in this or other embodiments a tension element of the one or more tension elements is formed from a plurality of steel wires.

Additionally or alternatively, in this or other embodiments a tension element of the one or more tension elements is formed from a plurality of fibers suspended in a matrix material.

Additionally or alternatively, in this or other embodiments an adhesive layer secures the one or more insert layers to the base material.

In another embodiment, an elevator system includes a hoistway, an elevator car movable along the hoistway, and one or more belts operably connected to the elevator car to propel the elevator car along the hoistway. A belt of the one or more belts includes one or more tension elements extending along a belt length, and a jacket at least partially encapsulating the one or more tension elements. The jacket includes a jacket base formed from a first material and one or more insert layers embedded in the jacket base material. The one or more insert layers have a corrugated shape along the belt length, and are formed from a second material different from the first material.

Additionally or alternatively, in this or other embodiments the corrugated shape is one or more of sinusoidal, triangular or rectangular.

Additionally or alternatively, in this or other embodiments the second material is non-elastomeric and has a melting temperature that is at least 10° C. higher than the processing temperature required to form the jacket base material.

Additionally or alternatively, in this or other embodiments the one or more insert layers contact the one or more tension elements.

Additionally or alternatively, in this or other embodiments the one or more insert layers at least partially define an outer surface of the belt.

Additionally or alternatively, in this or other embodiments the corrugated shape has a peak to valley height of at least three times a thickness of the insert layer.

Additionally or alternatively, in this or other embodiments the corrugated shape has a peak to valley height of at least four times a thickness of the insert layer.

Additionally or alternatively, in this or other embodiments a tension element of the one or more tension elements is formed from a plurality of steel wires.

Additionally or alternatively, in this or other embodiments a tension element of the one or more tension elements is formed from a plurality of fibers suspended in a matrix material.

BRIEF DESCRIPTION OF THE DRAWINGS

The following descriptions should not be considered limiting in any way. With reference to the accompanying drawings, like elements are numbered alike:

FIG. 6 is a lengthwise cross-sectional view of yet another embodiment of an elevator system belt;

FIG. 7 is a lengthwise cross-sectional view of still another embodiment of an elevator system belt;

FIG. 10 is a lengthwise cross-sectional view of still another embodiment of an elevator system belt.

DETAILED DESCRIPTION

A detailed description of one or more embodiments of the disclosed apparatus and method are presented herein by way of exemplification and not limitation with reference to the Figures.

Figure 1:
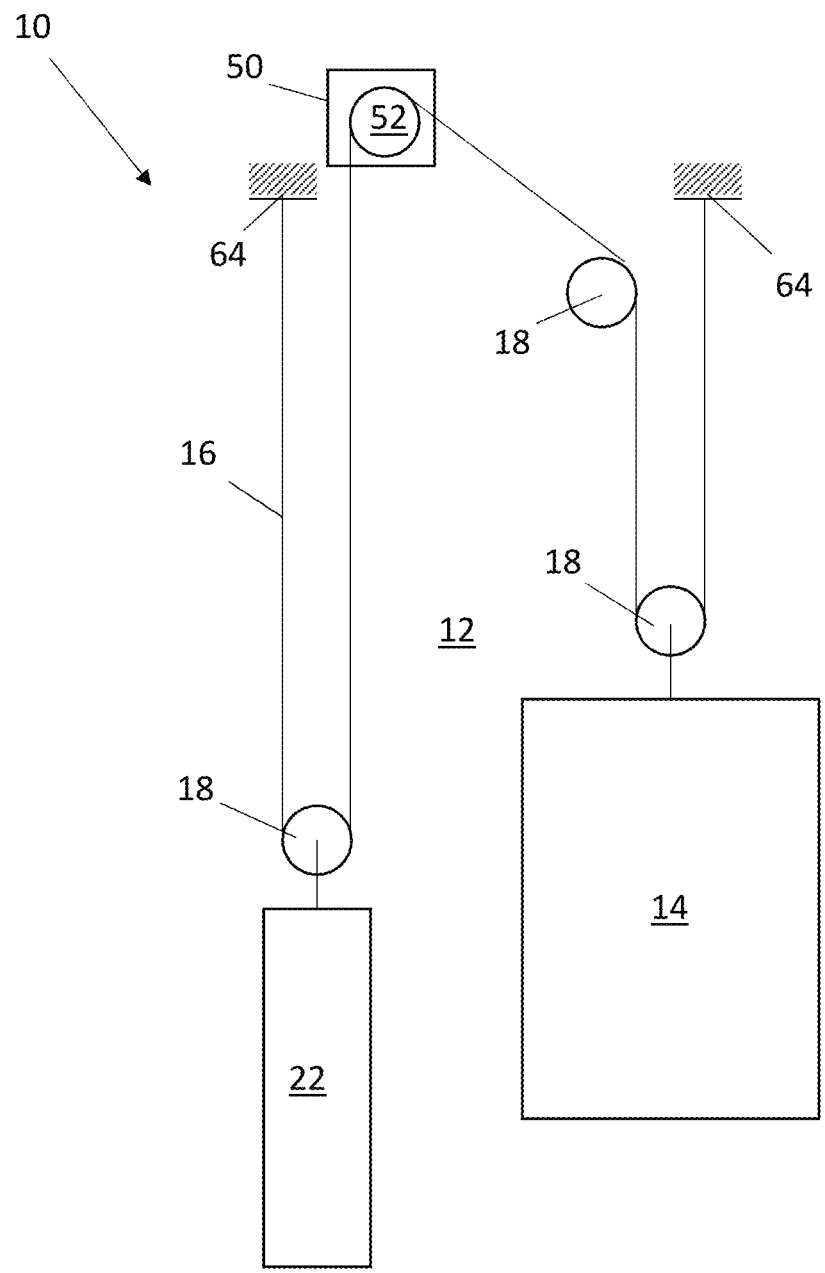
FIG. 1 is a schematic illustration of an elevator system.

Shown in FIG. 1 is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more tension members, for example, belts 16. The one or more belts 16 interact with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be routed over a sheave 18 supportive of a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14. In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 2:1 roping arrangement in which the one or more belts 16 terminate at terminations 64 located in the hoistway 12, while other embodiments may utilize other roping arrangements, such as a 1:1 roping arrangement.

The belts 16 are constructed to meet belt life requirements and have smooth operation, while being sufficiently strong to be capable of meeting strength requirements for suspending and/or driving the elevator car 14 and counterweight 22.

Figure 2A:
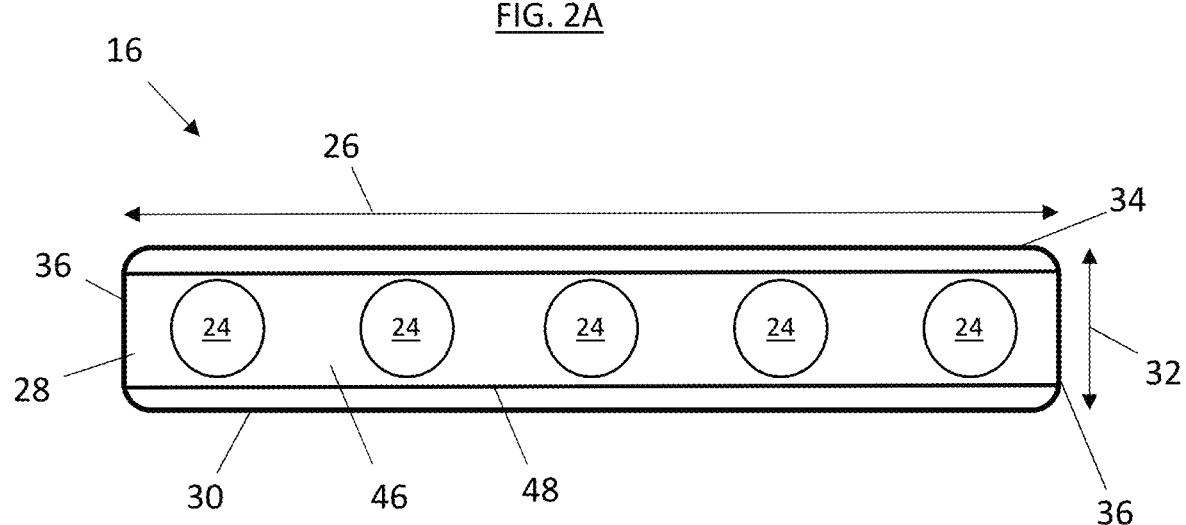
FIG. 2A is a cross-sectional view of an embodiment of an elevator system belt.

FIG. 2A provides a cross-sectional schematic of an exemplary belt 16 construction or design. The belt 16 includes a plurality of tension elements 24 extending longitudinally along the belt 16 and arranged across a belt width 26. The tension elements 24 are at least partially enclosed in a jacket 28 to restrain movement of the tension elements 24 in the belt 16 with respect to each other and to protect the tension elements 24. The jacket 28 defines a traction side 30 configured to interact with a corresponding surface of the traction sheave 52. A primary function of the jacket 28 is to provide a sufficient coefficient of friction between the belt 16 and the traction sheave 52 to produce a desired amount of traction therebetween. The jacket 28 should also transmit the traction loads to the tension elements 24. In addition, the jacket 28 should be wear resistant, fatigue resistant and protect the tension elements 24 from impact damage, exposure to environmental factors, such as chemicals, for example.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While five tension elements 24 are illustrated in the embodiment of FIG. 2A, other embodiments may include other numbers of tension elements 24, for example, 6, 10 or 12 tension elements 24. Further, while the tension elements 24 of the embodiment of FIG. 2 are substantially identical, in other embodiments, the tension elements 24 may differ from one another. While a belt 16 with a rectangular cross-section is illustrated in FIG. 2A, it is to be appreciated that belts 16 having other cross-sectional shapes are contemplated within the scope of the present disclosure.

Figure 3A:
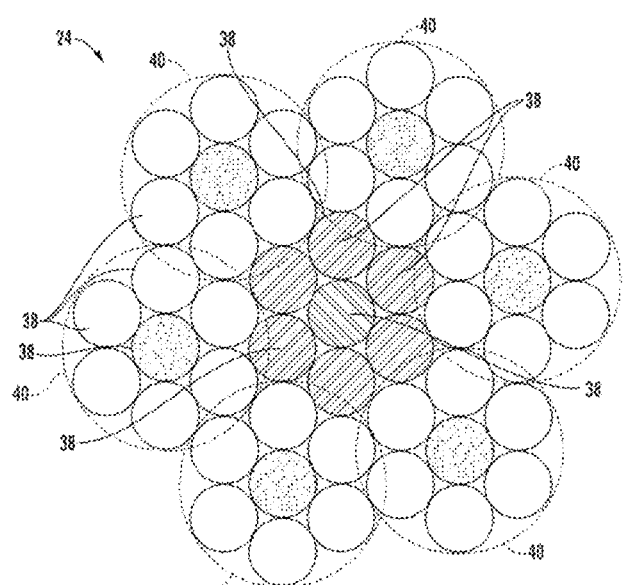
FIG. 3A is a cross-sectional view of an embodiment of a tension element for an elevator belt.
Figure 3B:
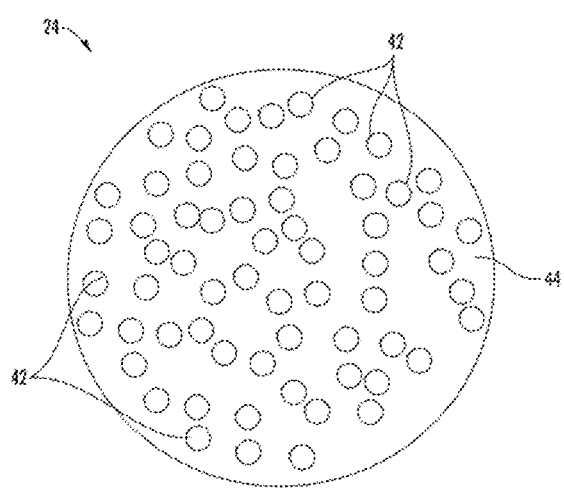
FIG. 3B is another cross-sectional view of an embodiment of a tension element for an elevator belt.

Referring now to FIG. 3A, the tension element 24 may be a plurality of wires 38, for example, steel wires 38, which in some embodiments are formed into one or more strands 40. In other embodiments, such as shown in FIG. 3B, the tension element 24 may include a plurality of fibers 42, such as carbon fiber, glass fiber aramid fiber, or their combination, disposed in a matrix material 44. Materials such as polyurethane, vinylester, or epoxy may be utilized as the matrix material, as well as other thermoset materials and, for example, thermoset polyurethane materials. While a circular cross-sectional tension element geometry is illustrated in the embodiment of FIG. 3B, other embodiments may include different tension element cross-sectional geometries, such as rectangular or ellipsoidal. While the cross-sectional geometries of the tension elements 24 in FIG. 2A are shown as identical, in other embodiment the tension elements' cross-sectional geometries may differ from one another.

Figure 2B:
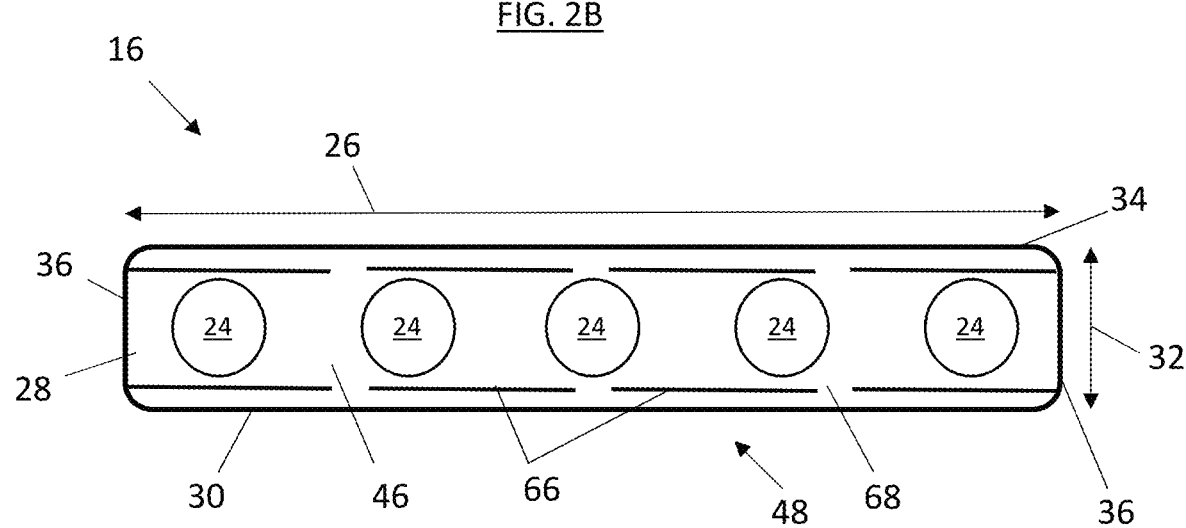
FIG. 2B is a cross-sectional view of another embodiment of an elevator system belt.
Figure 2C:
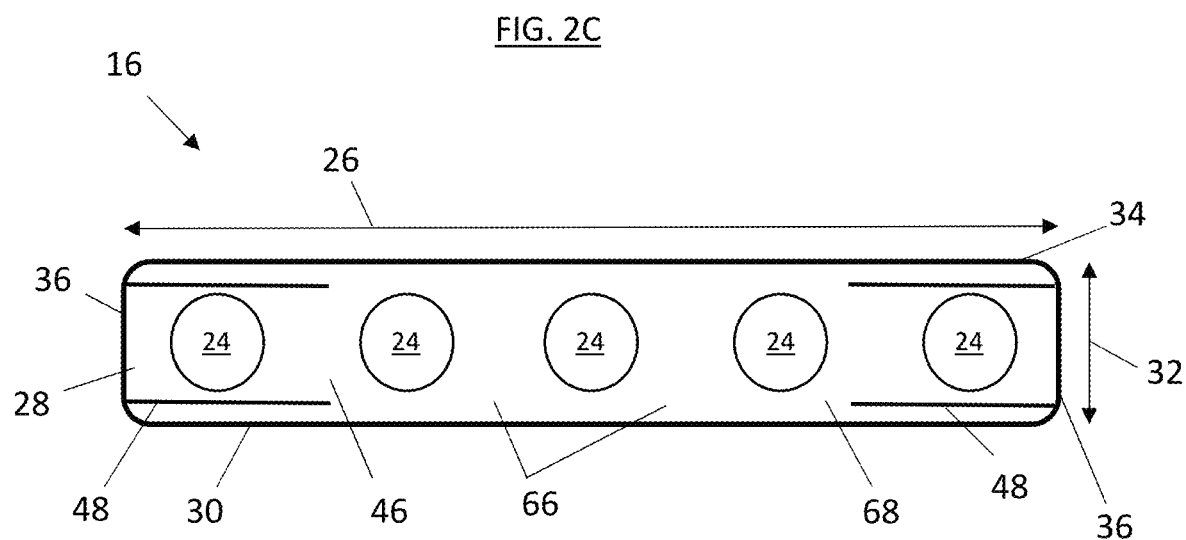
FIG. 2C is a cross-sectional view of yet another embodiment of an elevator system belt.
Figure 4:
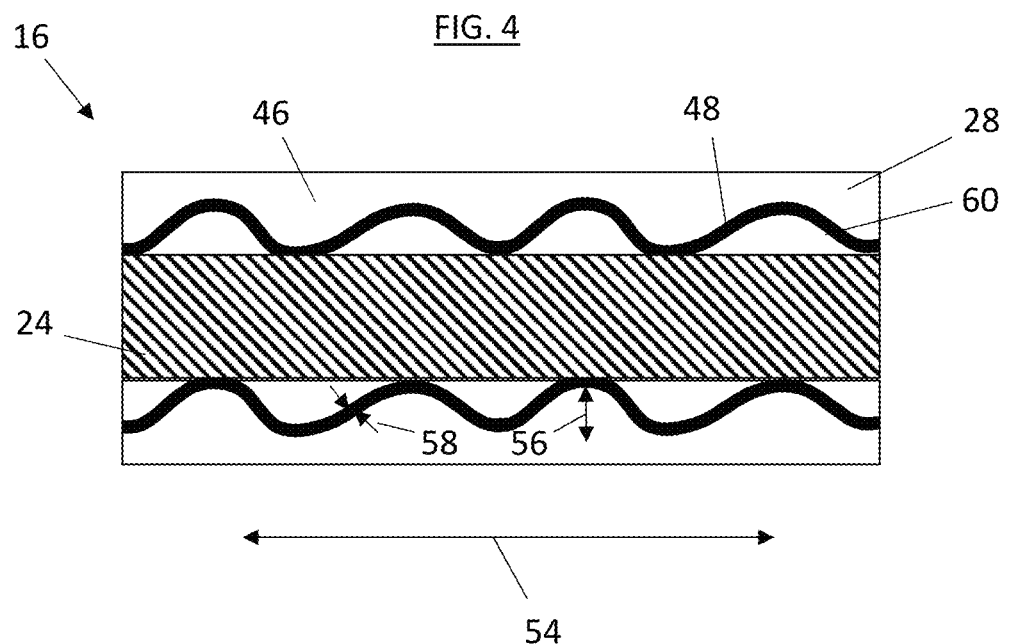
FIG. 4 is a lengthwise cross-sectional view of an embodiment of an elevator system belt.

Referring again to FIG. 2A, the jacket 28 includes a base material 46 and one or more insert layers 48. The base material 46 may be a conventional elastomeric material, or may be another material. The insert layers 48 extend across the belt width 26 and, as shown in FIG. 4, along a belt length direction 54. Referring again to FIG. 2A, in some embodiments, the one or more insert layers 48 extend across the full belt width 26 as a unitary piece. In another embodiment, the insert layer 48 includes multiple layer segments 66 each extending partially across the belt width 26, with a layer gap 68 between adjacent layer segments. While four layer segments 66 are illustrated in FIG. 2B, one skilled in the art will readily appreciate that other quantities of layer segments 66, for example, 2, 3 or 5 or more layer segments 66 may be utilized. In another embodiment, illustrated in FIG. 2C, the insert layers 48 are located only near the belt edges 36, only at an outermost 25%, for example, of the belt width 26. In other embodiments, the insert layer 48, and/or layer segments 66 are perforated.

Figure 5:
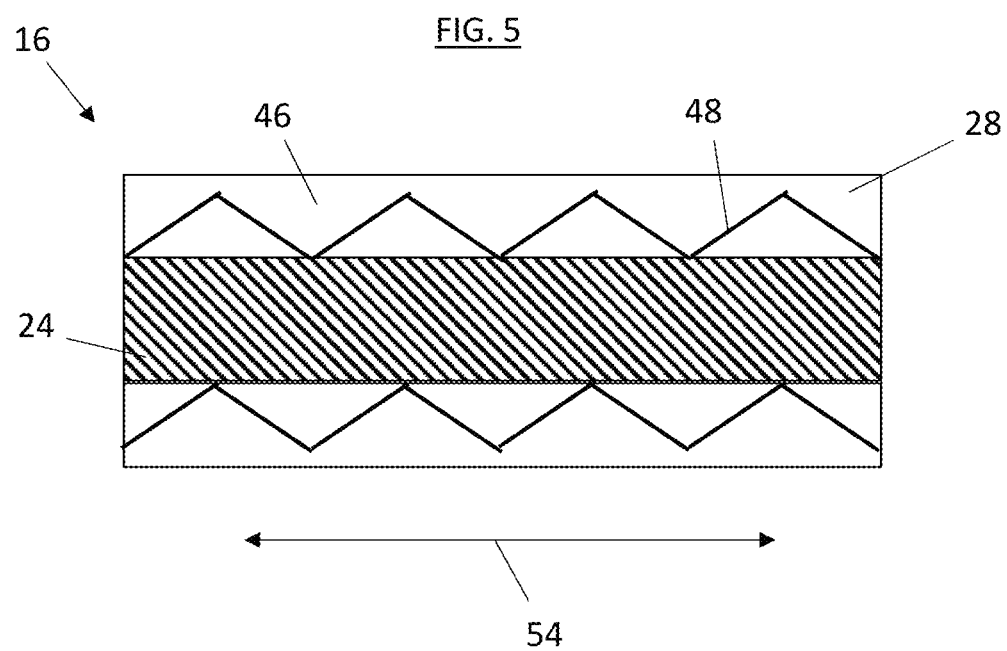
FIG. 5 is a lengthwise cross-sectional view of another embodiment of an elevator system belt.

The insert layer 48 has a corrugated shape in the belt length 54 direction, and is formed from a flexible but non elastomeric material. The insert layer 48 is formed from a material that has at least 10° C. higher melting temperature than the processing temperature required to form jacket 28. Exemplary materials for the insert layer 48 include but are not limited to aromatic polyesters, Nylons, and various aromatic ether ketones, and sulfones. In an exemplary embodiment, the insert layer 48 is formed from polyethylene terephthalate, a polyester with the a melting temperature between 245-260° C., and the base material 46 is a polyurethane with a processing temperature of 200° C. The insert layer 48 illustrated in FIG. 4 has a sinusoidal shape along the belt length direction 54 but it is to be appreciated that the insert layer 48 may have other shapes. For example, as shown in FIG. 5, the insert layer 48 may have a repeated triangular shape, or as shown in FIG. 6, a repeated rectangular shape. One skilled in the art will readily appreciate that the illustrated shapes of the corrugated insert layer are merely exemplary, and that other shapes may be utilized. The insert layer 48 has a peak-to-valley height 56 which is at least three times an insert layer thickness 58. In some embodiments, the peak to valley height 56 is greater than or equal to four times the insert layer thickness 58. In some embodiments, the insert layer 48 is preformed in the selected corrugated shape, and encapsulated by the base material 46 by, for example, extrusion during formation of the belt 16. An adhesive layer 60 may be utilized to secure the insert layer 48 to the base material 46. In other embodiments, the insert layer 48 is a flat sheet that is corrugated during manufacture of the belt 16, for example, just upstream of the jacket 28 extruder.

Referring again to FIG. 4, in some embodiments insert layers 48 are disposed both on a side of the jacket 28 between the tension elements 24 and the traction side 30, and on a side of the jacket 28 between the tension elements 24 and the back side 34. In other embodiments, however, the belt 16 may be one sided, such that an insert layer 48 is disposed only on a side of the jacket 28 between the tension elements 24 and the traction side 30, or on a side of the jacket 28 between the tension elements 24 and the back side 34.

Figure 8:
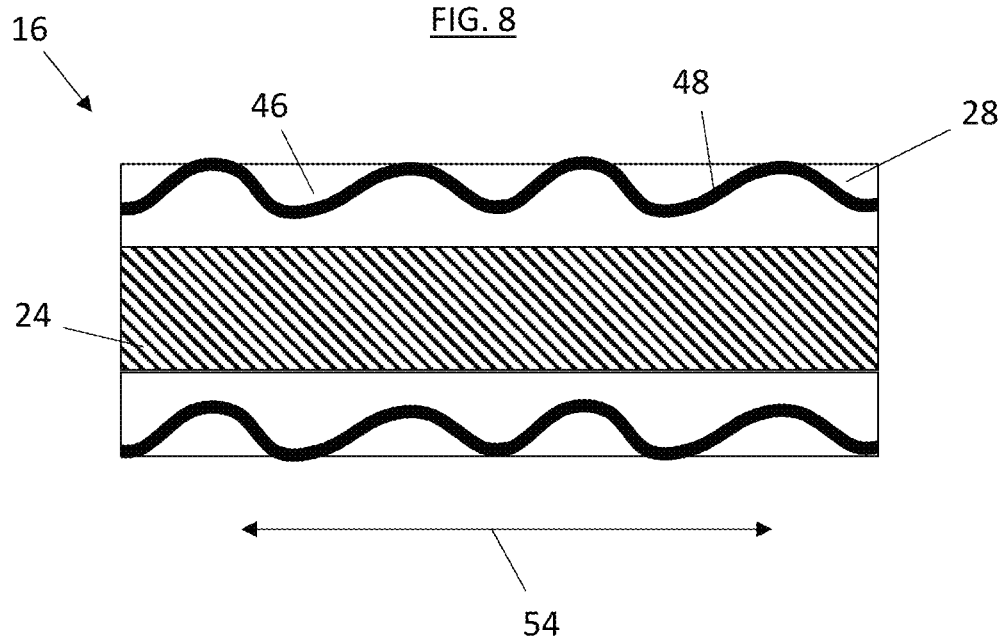
FIG. 8 is a lengthwise cross-sectional view of another embodiment of an elevator system belt.

The location of the insert layer 48 in the jacket 28 may be varied, depending on, for example, properties of the base material 46 and the insert layer 48. In the embodiment of FIG. 4, the insert layer 48 is positioned to be near to, and periodically contact the tension elements 24. In other embodiments, such as illustrated in FIG. 7, the insert layer 48 may be positioned midway between the tension element 24 and the traction side 30, and/or the back side 34. In still another embodiment, shown in FIG. 8, the insert layer 48 may at least partially define the traction side 30 and/or the back side 34 of the belt 16.

Figure 9:
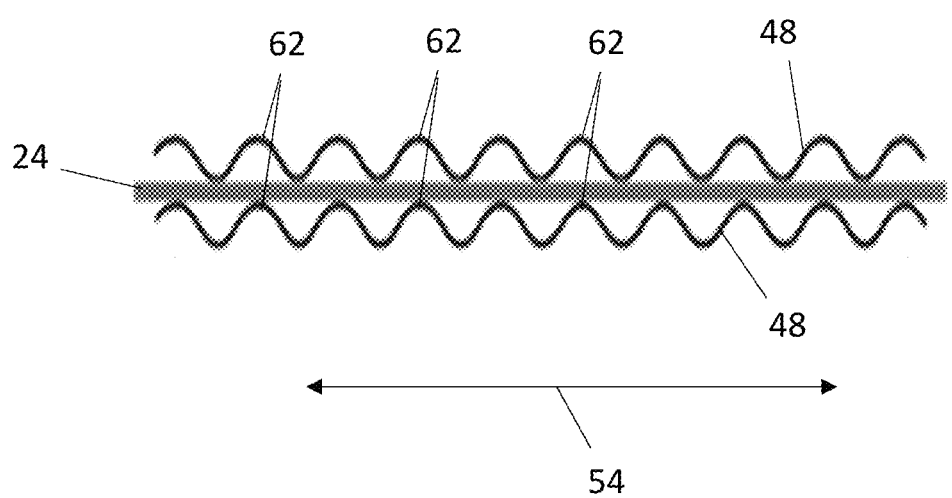
FIG. 9 is a lengthwise cross-sectional view of yet another embodiment of an elevator system belt.

Further, in some embodiments, the insert layer 48 configuration is the same on each side of the tension elements 24, while in other embodiments the configuration of the insert layer 48 may vary in, for example, shape, material or location. Referring now to FIG. 9, in some embodiments peaks 62 of the insert layer 48 are aligned along the belt length 54, while in another embodiment shown in FIG. 10 the peaks 62 of the insert layers 48 are shifted relative to one another.

One benefit of use of the corrugated insert layer 48 in the belt 16 is the substantial broadening of material types that can be used in the jacket 28, specifically materials which do not need to be elastomeric. This includes polymeric materials which are more rigid and metallic materials. Other benefits of allowing the use of such new types of materials may include enabling of smaller diameter sheaves when using materials which still have large strain capability, use of fire resistant materials and use of materials which can support larger pressures associated with larger cords. Further, the insert layers 48 may be advantageous in arresting cracks in the jacket 28 to extend useful life of the jacket 28 and thus the belt 16.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for an elevator system, comprising:
    one or more tension elements extending along a belt length; and
    a jacket at least partially encapsulating the one or more tension elements, the jacket including:
        a jacket base; and
        one or more insert layers embedded in the jacket base, the one or more insert layers having a corrugated shape along the belt length.

2. The belt of claim 1, wherein the corrugated shape is one or more of sinusoidal, triangular or rectangular.

3. The belt of claim 1, wherein the jacket base is formed from a first material and the insert layer is formed from a second material different from the first material.

4. The belt of claim 3, wherein the second material is non-elastomeric and has a melting temperature that is at least 10° C. higher than the processing temperature required to form the jacket base material.

5. The belt of claim 1, wherein the one or more insert layers contact the one or more tension elements.

6. The belt of claim 1, wherein the corrugated shape has a peak to valley height of at least three times a thickness of the insert layer.

7. The belt of claim 6, wherein the corrugated shape has a peak to valley height of at least four times a thickness of the insert layer.

8. The belt of claim 1, wherein a tension element of the one or more tension elements is formed from a plurality of steel wires.

9. The belt of claim 1, further comprising an adhesive layer to secure the one or more insert layers to the base material.

10. An elevator system, comprising:
    a hoistway;
    an elevator car movable along the hoistway;

one or more belts operably connected to the elevator car to urge the elevator car along the hoistway, a belt of the one or more belts including:
one or more tension elements extending along a belt length; and
a jacket at least partially encapsulating the one or more tension elements, the jacket including:
a jacket base formed from a first material; and
one or more insert layers embedded in the jacket base material, the one or more insert layers having a corrugated shape along the belt length, the one or more insert layers formed from a second material different from the first material.

11. The elevator system of claim 10, wherein the corrugated shape is one or more of sinusoidal, triangular or rectangular.

12. The elevator system of claim 10, wherein the second material is non-elastomeric and has a melting temperature that is at least 10° C. higher than the processing temperature required to form the jacket base material.

13. The elevator system of claim 10, wherein the one or more insert layers contact the one or more tension elements.

14. The elevator system of claim 10, wherein the corrugated shape has a peak to valley height of at least three times a thickness of the insert layer.

15. The elevator system of claim 14, wherein the corrugated shape has a peak to valley height of at least four times a thickness of the insert layer.

16. The elevator system of claim 10, wherein a tension element of the one or more tension elements is formed from a plurality of steel wires.

* * * * *